(12) United States Patent
Xu et al.

(10) Patent No.: US 9,167,643 B2
(45) Date of Patent: Oct. 20, 2015

(54) HIGH-PRECISION LED CONTROL CIRCUIT, METHOD AND LED DRIVER THEREOF

(71) Applicant: Silergy Semiconductor Technology (Hangzhou) LTD, Hangzhou, ZheJiang Province (CN)

(72) Inventors: Xiaoru Xu, Hangzhou (CN); Lu Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 174 days.

(21) Appl. No.: 14/037,795

(22) Filed: Sep. 26, 2013

(65) Prior Publication Data

US 2014/0132176 A1  May 15, 2014

(30) Foreign Application Priority Data

Nov. 12, 2012 (CN) .......................... 2012 1 0450521

(51) Int. Cl.
*H05B 33/08* (2006.01)
(52) U.S. Cl.
CPC ........... *H05B 33/0815* (2013.01); *Y02B 20/347* (2013.01)

(58) Field of Classification Search
CPC .......... H05B 33/0815; H05B 33/0818; H05B 33/0812; H05B 33/0809; H05B 33/0836; H05B 33/0839; Y02B 20/347; Y02B 20/346; Y02B 20/343; Y02B 20/345
See application file for complete search history.

(56) References Cited

U.S. PATENT DOCUMENTS

| | | | |
|---|---|---|---|
| 7,388,359 B1 * | 6/2008 | Ling | 323/284 |
| 7,557,519 B2 * | 7/2009 | Kranz | 315/291 |
| 7,595,622 B1 * | 9/2009 | Tomiyoshi et al. | 323/285 |
| 7,898,187 B1 * | 3/2011 | Mei et al. | 315/247 |
| 2006/0226898 A1 * | 10/2006 | Vitunic et al. | 330/9 |
| 2012/0201019 A1 | 8/2012 | Chung et al. | |

\* cited by examiner

*Primary Examiner* — Jung Kim
(74) *Attorney, Agent, or Firm* — Michael C. Stephens, Jr.

(57) ABSTRACT

In one embodiment, a light-emitting diode (LED) driver can include: (i) a reference voltage control circuit configured to provide a reference voltage signal in response to an enable signal; (ii) a current control circuit configured to control an output current of the LED driver in response to the reference voltage signal; and (iii) the LED driver being configured to drive an LED load when the enable signal is active.

15 Claims, 6 Drawing Sheets

US 9,167,643 B2

HIGH-PRECISION LED CONTROL CIRCUIT, METHOD AND LED DRIVER THEREOF

RELATED APPLICATIONS

This application claims the benefit of Chinese Patent Application No. 201210450521.8, filed on Nov. 12, 2012, which is incorporated herein by reference in its entirety.

FIELD OF THE INVENTION

The present invention relates to the field of light-emitting diode (LED) drivers, and more particularly to high-precision LED drivers and methods.

BACKGROUND

With continuous innovation and development in the lighting industry, as well as the increasing importance of energy-saving and environmental protection, LED lighting is becoming the prominent energy-efficient lighting technology. However, due to volt-ampere principles and temperature characteristics, LEDs are more sensitive to current than voltage. Thus, conventional power supplies may not be directly provided to the LEDs. Rather, an appropriate LED driver can be employed with the power supply when using LED as a lighting source.

SUMMARY

In one embodiment, a light-emitting diode (LED) driver can include: (i) a reference voltage control circuit configured to provide a reference voltage signal in response to an enable signal; (ii) a current control circuit configured to control an output current of the LED driver in response to the reference voltage signal; and (iii) the LED driver being configured to drive an LED load when the enable signal is active.

In one embodiment, a method of controlling an LED, can include: (i) providing, by a reference voltage control circuit, a reference voltage signal in response to an enable signal; (ii) controlling, by a current control circuit, an output current of an LED driver in response to the reference voltage signal; and (iii) driving, by the LED driver, an LED load when the enable signal is active.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
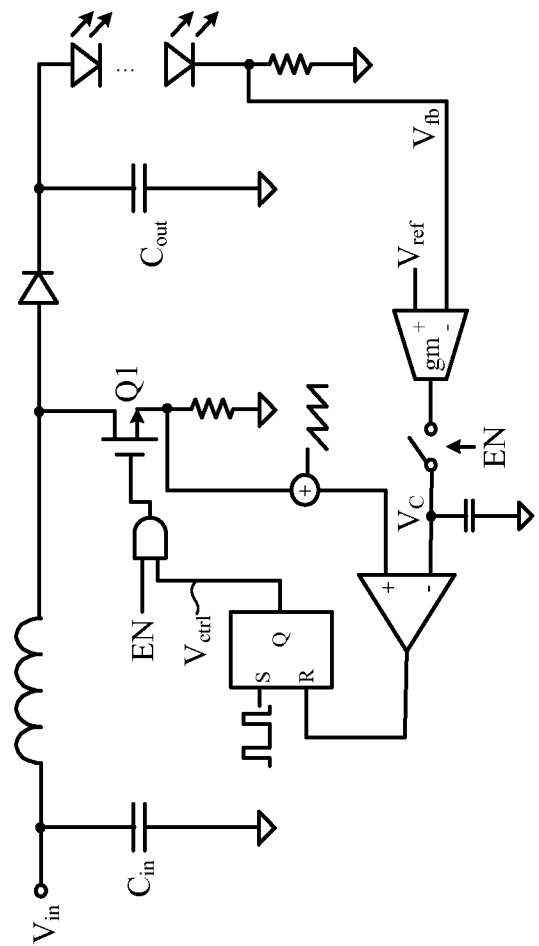
FIG. 1A is a schematic block diagram of an example LED driver.

Referring now to FIG. 1A, shown is an example light-emitting diode (LED) driver. This example LED driver can be controlled by enable signal EN, which can be a square wave signal with a fixed duty cycle. When enable signal EN is active, a power stage circuit can be enabled to transmit electrical energy (e.g., voltage, current, etc.) from an input power supply. When enable signal EN is inactive, the power stage circuit may be disabled. In this way, e.g., LED dimming can be realized. As shown in FIG. 1A, control signal $V_{ctrl}$ (e.g., output by a control circuit) and enable signal EN can be used to control main switch Q1 after a suitable logic operation.

The transconductance amplifier in the control circuit of the LED driver can receive reference voltage signal $V_{ref}$ and output voltage feedback signal $V_{fb}$. The transconductance amplifier can generate an output current for charging a capacitor based on a difference between reference voltage signal $V_{ref}$ and output voltage feedback signal $V_{fb}$, so as to obtain compensation signal $V_C$. In order to prevent compensation signal $V_C$ from rising continuously due to charging the capacitor through an output current of the transconductance amplifier when EN is inactive, an output of the transconductance amplifier can connect to a switch that is controlled by enable signal EN. When the power stage circuit is disabled, the switch can be turned off to stop the output current of the transconductance amplifier from charging the capacitor.

Figure 1B:
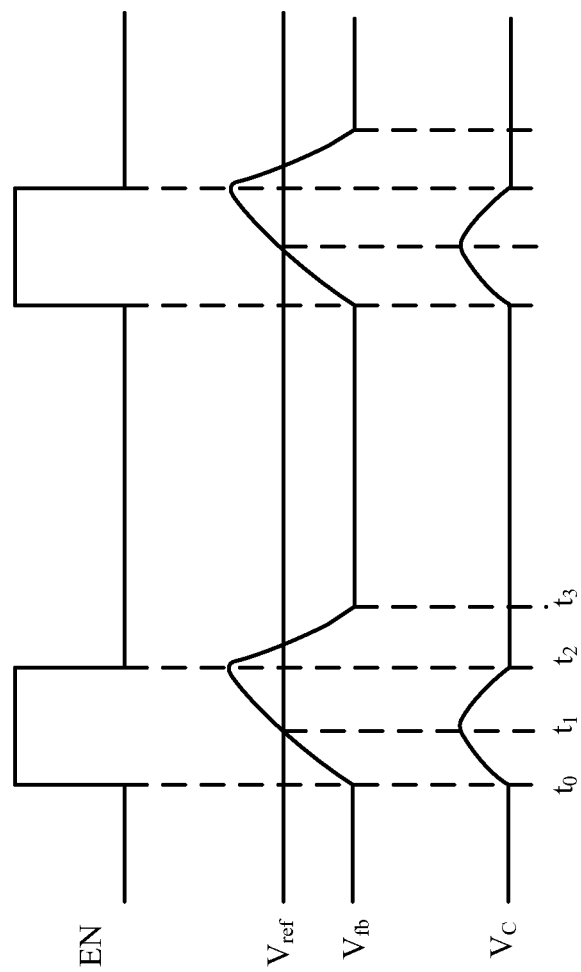
FIG. 1B is a waveform diagram showing example operation of the LED driver of FIG. 1A.

However, this particular circuit structure has some drawbacks, as shown in the example operation waveform diagram of FIG. 1B. From time $t_0$ to time $t_2$ when enable signal EN is high, output voltage feedback signal $V_{fb}$ may gradually rise but may remain less than reference voltage $V_{ref}$ prior to time $t_1$, and as a result compensation signal $V_C$ may also gradually rise. From time $t_1$ to time $t_2$, output voltage feedback signal $V_{fb}$ can be higher than reference voltage $V_{ref}$, so compensation signal $V_C$ may gradually decrease. At time $t_2$, the enable signal may become inactive, so the switch at the transconductance amplifier output can be turned off and compensation signal $V_C$ may drop to the voltage value as seen prior to time $t_0$.

From time $t_2$ to time $t_3$, output voltage feedback signal $V_{fb}$ may gradually drop to zero. It can be seen that the integral value of output voltage feedback signal $V_{fb}$ from time $t_0$ to time $t_2$ can be substantially equal to a product of duty cycle D of enable signal EN and reference voltage signal $V_{ref}$. Also, the integral value for a full dimming cycle should also include the integral value from time $t_2$ to time $t_3$. During a dimming cycle, the integral values at the two input terminals of the transconductance amplifier may not be equal to each other.

From time $t_2$ to time $t_3$, an output current formed by the difference between output voltage feedback signal $V_{fb}$ and reference voltage $V_{ref}$ as seen at the transconductance amplifier output may not charge the capacitor. In other words, the variation information of output voltage feedback signal $V_{fb}$ may not be precisely represented by the value of compensation signal $V_C$ during this period. As a result, compensation signal $V_C$ may be relatively small (e.g., in absolute value, duty cycle, and/or duration), possibly leading to inaccurate LED load dimming. When the duty cycle of enable signal EN is relatively low, this problem may be exacerbated.

In one embodiment, an LED driver can include: (i) a reference voltage control circuit configured to provide a reference voltage signal in response to an enable signal; (ii) a current control circuit configured to control an output current of the LED driver in response to the reference voltage signal; and (iii) the LED driver being configured to drive an LED load when the enable signal is active.

Figure 2A:
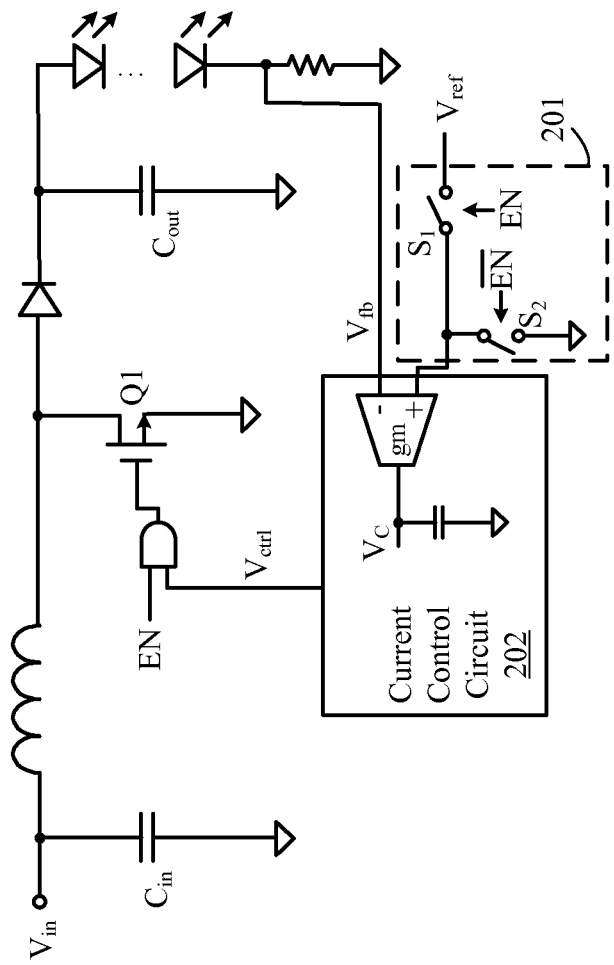
FIG. 2A is a schematic block diagram of a first example control circuit for an LED driver in accordance with embodiments of the present invention.

Referring now to FIG. 2A, shown is a schematic block diagram of a first example control circuit for an LED driver in accordance with embodiments of the present invention. In this example, the LED driver can receive enable signal EN, and can transform electrical energy (e.g., voltage, current, etc.) to drive an LED load when enable signal EN is active. Also, this particular LED driver can include reference voltage control circuit 201 and current control circuit 202. Reference voltage control circuit 201 can receive reference voltage signal $V_{ref}$ and enable signal EN. For example, reference voltage control circuit 201 can provide reference voltage signal $V_{ref}$ to current control circuit 202 when enable signal EN is active.

Current control circuit 202 can include a compensation circuit formed by a transconductance amplifier and a compensation capacitor, as shown. For example, a non-inverting input of the transconductance amplifier can receive reference voltage signal $V_{ref}$ from reference voltage control circuit 201. Also, an inverting input of the transconductance amplifier can receive output voltage feedback signal $V_{fb}$ of the LED driver. For example, output voltage feedback signal $V_{fb}$ can be derived from a series connection of the LED load and a resistor, as shown. Of course, other arrangements and/or circuitry can be employed in order to determine feedback information relative to the LED load and/or driver. Compensation signal $V_C$ can be obtained based on the transconductance amplifier output signal (e.g., a current) as passed through a compensation capacitor in order to form a compensation voltage. Current control circuit 202 can be utilized to control main switch Q1 to realize electrical energy transformation based on compensation signal $V_C$.

For example, enable signal EN can include or be configured as a square wave signal. In one example, the square wave signal may have a fixed duty cycle, and in other cases a variable duty cycle square wave can be employed. Reference voltage control circuit 201 can include switches $S_1$ and $S_2$. A first power terminal of switch $S_1$ can receive reference voltage signal $V_{ref}$, and a second power terminal of switch $S_1$ can be configured as an output of reference voltage control circuit 201. The reference voltage control circuit output can connect to a non-inverting input terminal of the transconductance amplifier, as shown. Also, a control terminal to control the switching operation of switch $S_1$ can connect to enable signal EN. Enable signal EN can control operation of switch $S_1$. Switch $S_2$ can be coupled between an input of reference voltage control circuit 201 and ground, and an inverted version of enable signal EN can control operation of switch $S_2$.

For example, if enable signal EN is active high, reference voltage control circuit 201 can output or provide reference voltage signal $V_{ref}$ to current control circuit 202 (e.g., the compensation circuit) when enable signal EN is high. When enable signal EN is low, reference voltage control circuit 201 can disallow reference voltage signal $V_{ref}$ from being provided to current control circuit 202. Also, when enable signal EN is low, the inverted version of enable signal EN is high, and switch $S_2$ can be closed in order to discharge the output of reference voltage control circuit 201 to ground. Of course, other arrangements or circuitry can be employed in order to provide a signal other than reference voltage signal $V_{ref}$ when enable signal EN is low. For example, a different voltage level other than ground (e.g., a different reference level, a supply level, etc.) may be provided via switch $S_2$, or other multiplexer arrangements (e.g., two or more voltage levels for selection) can also be supported in particular embodiments.

In the particular example of FIG. 2A, the power stage circuit of the LED driver can be configured as a boost converter. However, any suitable converter topology (e.g., flyback, buck, Sepic, etc.) can be supported in particular embodiments. In addition, different types of loads, such as other lighting technologies, can also be supported. Further, other circuit arrangements or implementations, such as for switching or multiplex circuitry of reference voltage control circuit 201 and/or amplifier or capacitor configurations of current control circuit 202, can also be supported in certain embodiments.

Figure 2B:
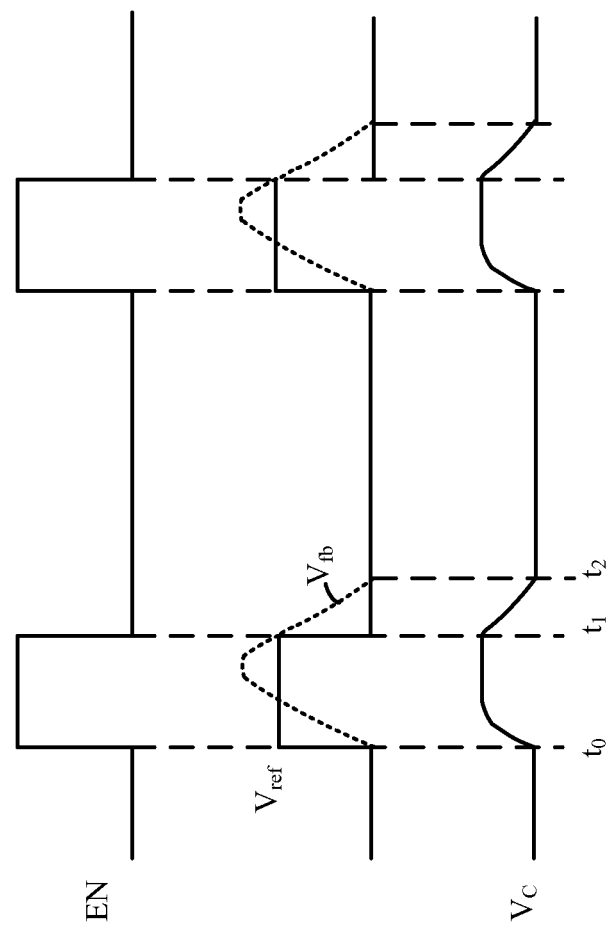
FIG. 2B is a waveform diagram showing example operation of the control circuit for the LED driver of FIG. 2A.

Referring now to FIG. 2B, shown is a waveform diagram of example operation of the control circuit for the LED driver of FIG. 2A. From time $t_0$ to time $t_1$, enable signal EN may remain high, and reference voltage signal $V_{ref}$ can be provided to current control circuit 202. Thus, the transconductance amplifier can output a certain current to charge the compensation capacitor based on a difference between reference voltage signal $V_{ref}$ and output voltage feedback signal $V_{fb}$. When the input signals of the transconductance amplifier are nearly equal (e.g., less than a predetermined amount), its output current can be almost zero, such that compensation signal $V_C$ can remain substantially unchanged. At time $t_1$, as enable signal EN goes low, the transconductance amplifier may not receive reference voltage signal $V_{ref}$, and may instead receive a ground level signal.

However, as output voltage feedback signal $V_{fb}$ begins to drop, and an output of the transconductance amplifier is coupled with the compensation capacitor, the compensation capacitor may begin to discharge. Thus, compensation signal $V_C$ may gradually until time $t_2$ when output voltage feedback signal $V_{fb}$ drops to zero. It can be seen that the integral value of output voltage feedback signal $V_{fb}$ from time $t_0$ to $t_2$ can be substantially equal to the product of duty cycle D of enable signal EN and reference voltage signal $V_{ref}$. Therefore, the integral values at the two inputs of the transconductance amplifier can be substantially the same. When enable signal EN is inactive low, reference voltage signal $V_{ref}$ may not be provided to current control circuit 202, and instead a ground level signal can be provided via switch $S_2$. However, current control circuit 202 may still ensure that variation information of output voltage feedback signal $V_{fb}$ is accurately represented by the value of compensation signal $V_C$. In this way, more accurate LED load dimming can be realized, as compared to conventional approaches.

Figure 3:
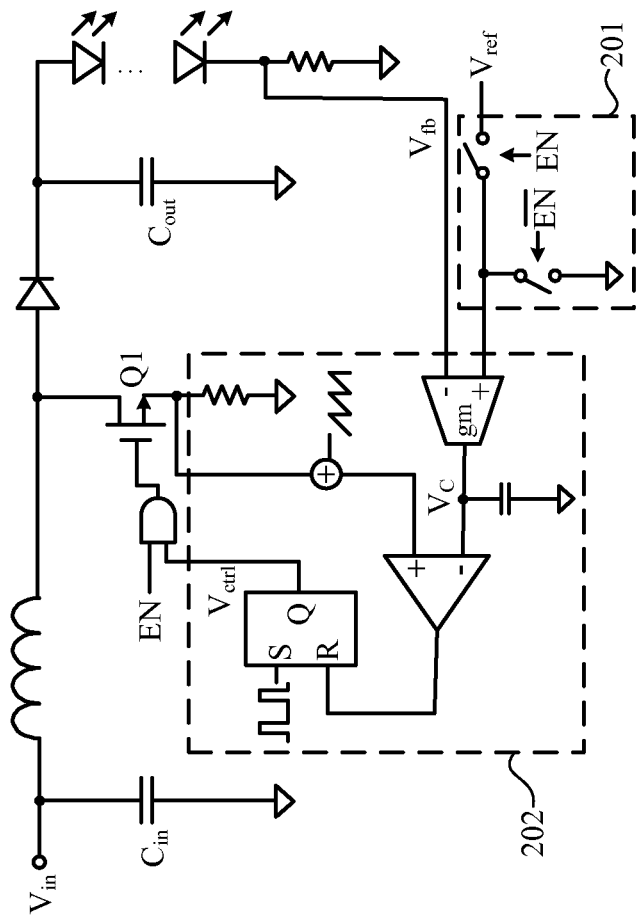
FIG. 3 is a schematic block diagram of a second example control circuit for an LED driver in accordance with embodiments of the present invention.

Referring now to FIG. 3, shown is a schematic block diagram of a second example control circuit for an LED driver in accordance with embodiments of the present invention. In this particular example, current control circuit 202 can include a comparator and an RS flip-flop. After comparing compensation signal $V_C$ against a current sampling signal with slope compensation, main switch Q1 can be turned off through the RS flip-flop. Main switch Q1 can be turned on by triggering the RS flip-flop through a clock signal (e.g., at the set input) with a certain or fixed frequency. Of course, other configurations and/or circuitry can be employed for current control circuit 202.

The following will describe an example control method for an LED driver in accordance embodiments of the present invention. In one embodiment, a method of controlling an LED, can include: (i) providing, by a reference voltage control circuit, a reference voltage signal in response to an enable signal; (ii) controlling, by a current control circuit, an output current of an LED driver in response to the reference voltage signal; and (iii) driving, by the LED driver, an LED load when the enable signal is active.

Figure 4:
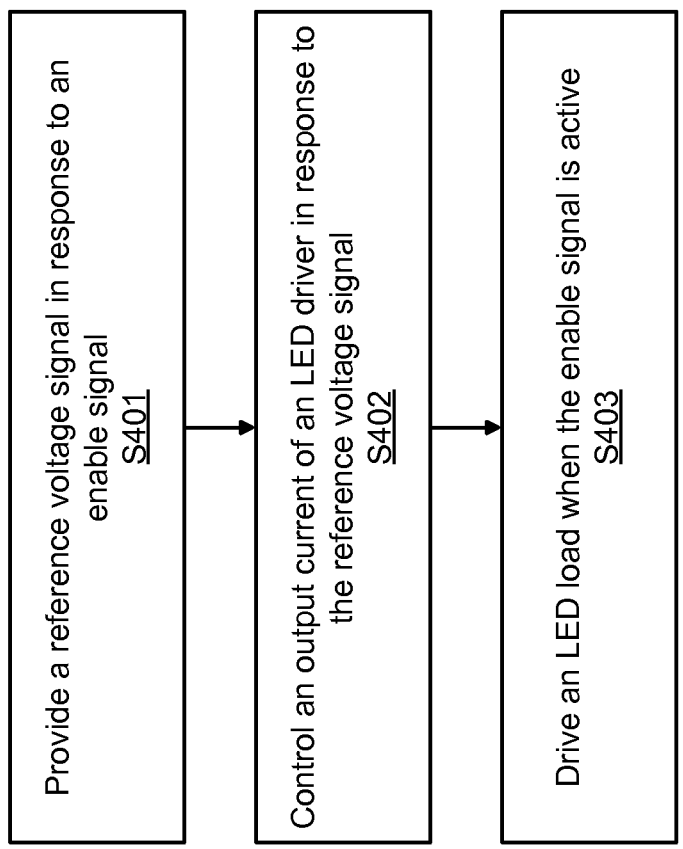
FIG. 4 is a flow diagram of an example control method for an LED driver in accordance with embodiments of the present invention.

Referring now to FIG. 4, shown is a flow diagram of an example control method for an LED driver in accordance with embodiments of the present invention, which can include. At S401, a reference voltage signal can be provided in response to an enable signal. For example, the reference voltage signal can be provided (e.g., via reference voltage control circuit 201) when the enable signal is active, and a low signal (e.g., ground) can be provided when the enable signal is inactive.

At S402, an output current can be controlled in response to the reference voltage signal. For example, control circuit 202 can be employed in order to generate a compensation signal. In one case, the compensation signal can be output in response to a comparison of the reference voltage signal and an output voltage feedback signal. At S403, the LED load can be driven when the enable signal is active. For example, main switch Q1 can be enabled via an output from an AND-gate that receives an enable signal EN and a control signal $V_{ctrl}$ output from current control circuit 202. Also for example, the enable signal can be configured as a square wave signal with fixed duty cycle.

In this way, a high-precision LED driver can be provided in particular embodiments. For example, the LED driver can include a power stage circuit and a control circuit (e.g., including reference voltage control circuit 201 and current control circuit 202). The LED driver can receive an enable signal, and the power stage circuit can transform electrical energy to drive an LED load when the enable signal is active. The control circuit can include any appropriate control circuit, including voltage and/or current control circuits, as described above.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A light-emitting diode (LED) driver, comprising:
 a) a reference voltage control circuit configured to provide a reference voltage signal in response to an enable signal;
 b) a current control circuit configured to generate a control signal to control an output current of said LED driver in response to said reference voltage signal and an output voltage feedback signal from an LED load;
 c) a power switch controllable by said enable signal and said control signal that are received at inputs of a logic gate, wherein an output of said logic gate is only coupled to a gate of said power switch; and d) said LED driver being configured to drive said LED load when said enable signal is active.

2. The LED driver of claim 1, wherein said reference voltage control circuit comprises:
 a) a first switch having a first power terminal configured to receive said reference voltage signal, and a second power terminal configured to output said reference voltage signal when said enable signal is active; and
 b) a second switch coupled between said second power terminal of said first switch and ground, wherein said second switch is controllable by an inverted version of said enable signal.

3. The LED driver of claim 2, wherein said current control circuit comprises:
 a) a transconductance amplifier having a non-inverting input terminal coupled to said second power terminal of said first switch, and an inverting input terminal coupled to said output voltage feedback signal; and
 b) a compensation capacitor coupled to an output of said transconductance amplifier, and configured to provide a compensation signal.

4. The LED driver of claim 1, wherein said enable signal comprises a square wave signal.

5. The LED driver of claim 4, wherein said square wave signal comprises a fixed duty cycle.

6. The LED driver of claim 1, further comprising a power stage circuit comprising said power switch and being configured to convert electrical energy to drive said LED load when said enable signal is active.

7. A method of controlling a light-emitting diode (LED), the method comprising:
 a) providing, by a reference voltage control circuit, a reference voltage signal in response to an enable signal;
 b) controlling, by a current control circuit generating a control signal, an output current of an LED driver in response to said reference voltage signal and an output voltage feedback signal from an LED load;
 c) controlling a power switch by said enable signal and said control signal that are received at inputs of a logic gate, wherein an output of said logic gate is only coupled to a gate of said power switch; and
 d) driving, by said LED driver, said LED load when said enable signal is active.

8. The method of claim 7, further comprising generating a compensation signal in response to said reference voltage signal and said output voltage feedback signal.

9. The method of claim 7, wherein said enable signal comprises a square wave signal.

10. The method of claim 7, wherein said square wave signal comprises a fixed duty cycle.

11. The method of claim 7, wherein said enable signal is an input-only signal received by said LED driver.

12. The method of claim 8, wherein said generating said control signal comprises comparing said compensation signal against a current sampling signal with slope compensation.

13. The LED driver of claim 3, further comprising a comparator configured to compare said compensation signal against a current sampling signal with slope compensation.

14. The LED driver of claim 12, further comprising an RS flip-flop having a set terminal coupled to a clock signal, a reset terminal coupled to an output of said comparator, and an output terminal configured as said control signal.

15. The LED driver of claim 1, wherein said enable signal is an input-only signal received by said LED driver.

* * * * *